(12) United States Patent
Chen et al.

(10) Patent No.: US 8,799,383 B2
(45) Date of Patent: Aug. 5, 2014

(54) METHOD AND SYSTEM FOR TRANSMITTING WIDGET MESSAGE

(75) Inventors: Xiyuan Chen, Beijing (CN); Xiaoqing Huang, Beijing (CN); Yanqun Deng, Beijing (CN)

(73) Assignee: Borqs Wireless Ltd., Beijing (CN)

( * ) Notice: Subject to any disclaimer, the term of this patent is extended or adjusted under 35 U.S.C. 154(b) by 96 days.

(21) Appl. No.: 13/294,111

(22) Filed: Nov. 10, 2011

(65) Prior Publication Data

US 2012/0079048 A1 Mar. 29, 2012

Related U.S. Application Data

(63) Continuation of application No. PCT/CN2010/077555, filed on Oct. 1, 2010.

(30) Foreign Application Priority Data

Feb. 10, 2010 (CN) .......................... 2010 1 0111471

(51) Int. Cl.
  *G06F 15/16* (2006.01)
  *H04W 12/06* (2009.01)
  *H04W 12/00* (2009.01)
  *H04W 4/14* (2009.01)
  *H04W 4/00* (2009.01)
  *H04W 80/12* (2009.01)
  *H04W 4/20* (2009.01)

(52) U.S. Cl.
  CPC ............... *H04W 4/14* (2013.01); *H04W 4/003* (2013.01); *H04W 80/12* (2013.01); *H04W 4/20* (2013.01)
  USPC ........... 709/206; 709/203; 709/204; 709/205; 709/221

(58) Field of Classification Search
  USPC ......... 709/203, 204, 205, 206, 207, 217, 218, 709/219, 223, 231
  See application file for complete search history.

(56) References Cited

U.S. PATENT DOCUMENTS 7,050,792 B2* 5/2006 Chou et al. ................. 455/412.2
7,606,562 B2* 10/2009 Aaltonen et al. ........... 455/414.1
(Continued)

FOREIGN PATENT DOCUMENTS

CN 1838784 9/2006
CN 101610485 12/2009
(Continued)

OTHER PUBLICATIONS

International Search Report for PCT/CN2010/077555, mailed on Jan. 13, 2011, in 4 pages.

*Primary Examiner* — Jeffrey Nickerson
*Assistant Examiner* — Linh Nguyen
(74) *Attorney, Agent, or Firm* — Knobbe, Martens, Olson & Bear LLP

(57) ABSTRACT

A method and a system for transmitting a widget message are described herein. The method can include: a widget mobile terminal transmitting a widget message to a receiver through a widget server; after receiving the widget message sent from the widget mobile terminal, the widget server judging whether the receiver supports the widget; if judging that the receiver supports the widget, then transmitting the received widget message to the receiver; and if judging that the receiver does not support the widget, then transmitting a corresponding message to the receiver via a message center. A widget mobile user can transmit a widget to another widget mobile user, and the receiver can run the widget application directly while receiving the widget message.

8 Claims, 3 Drawing Sheets

(56) References Cited

U.S. PATENT DOCUMENTS

| | | | |
|---|---|---|---|
| 8,238,891 B1* | 8/2012 | Tam et al. | 455/418 |
| 2003/0193967 A1* | 10/2003 | Fenton et al. | 370/490 |
| 2004/0148400 A1* | 7/2004 | Mostafa | 709/227 |
| 2005/0204016 A1* | 9/2005 | McAuley | 709/218 |
| 2006/0184609 A1* | 8/2006 | Deng | 709/203 |
| 2006/0195506 A1* | 8/2006 | Deng | 709/203 |
| 2008/0188251 A1* | 8/2008 | Weinrib | 455/466 |
| 2010/0041423 A1* | 2/2010 | McNamara et al. | 455/466 |
| 2011/0314168 A1* | 12/2011 | Bathiche et al. | 709/228 |

FOREIGN PATENT DOCUMENTS

| | | |
|---|---|---|
| CN | 101815265 | 8/2010 |
| EP | 1747650 A1 * | 1/2007 |

* cited by examiner

METHOD AND SYSTEM FOR TRANSMITTING WIDGET MESSAGE

CROSS-REFERENCE TO RELATED APPLICATIONS

This application is a continuation of International Patent Application No. PCT/CN2010/077555, filed on Oct. 1, 2010, which claims foreign priority from CN 201010111471.1, filed on Feb. 10, 2010, each of which are incorporated herein by reference in their entirety.

BACKGROUND

1. Field

The present application relates to a kind of mobile communication transmission, and in particular to a method and a system for transmitting a Widget Message Service (WMS).

2. Background

Short Message Service (SMS) is a telecommunication service that emerged with the development of digital mobile communication systems. SMS can transmit textual or digital short messages through the signaling channels and signaling networks in the mobile communication system, and can belong to a non-real-time and non-voice data communication service.

The message length of SMS cannot exceed 160 English or numerical characters or 70 Chinese characters. In addition, SMS can employ a store-and-forward transmission mode, which can be to say, when a user cannot receive short messages, the short messages will not be lost, but will be temporarily stored in the SMS center; once the user logs into the network again, the stored short messages will be transmitted to the user's cell phone.

Multimedia Message Service (MMS) can transmit image, sound, text and other information utilizing Wireless Application Protocol (WAP) as carrier with the support of GPRS or 3G network. MMS can implement the transmission of multimedia messages between cell phone terminals, and from cell phone terminals to internet or from internet to cell phone terminals.

The above-mentioned SMS and MMS can provide contents with limited capacity. For example, each short message can carry 140 bytes of character information or 70 Chinese characters at most; the information capacity of each multimedia message can be limited by the user's terminals, and can be 300 kb in average. In addition, SMS and MMS can transmit static contents. For example, SMS can send and receive textual messages and display the messages in a simple form; whereas, MMS can support multimedia data formats but cannot to transmit more complex contents.

SUMMARY

The method and the system discussed herein each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include increased capacity and support for dynamic contents.

According to one embodiment, the widget message service (WMS) transmission method can include: sending a widget message that contains source address and address of the receiver, by a widget mobile terminal, to the receiver, via a widget server; after receiving the widget message sent from the widget mobile terminal, judging whether the receiver supports widget, by the widget server; forwarding the received widget message to the receiver if the receiver can be judged as supporting widget; and sending a corresponding message to the receiver via a message center if the receiver can be judged as not supporting widget.

According to another embodiment, the WMS transmission system can include: a widget mobile terminal configured to send widget messages to the receiver via a widget server; the widget server configured to perform the following operations: judging whether the receiver supports widget, after receiving a widget message sent from the widget mobile terminal; sending the received widget message to the receiver, if the receiver can be judged as supporting widget; sending a corresponding message to the receiver via a SMS center, if the receiver can be judged as not supporting widget.

Furthermore, features of embodiments of the present disclosure can also include advantages such as that a widget mobile user can send a widget to another widget mobile user, and the receiver can run the widget application directly once it receives the widget message. Additionally, WMS can be messages that mainly contain widget content, and can be capable of providing richer content: WMS can provide the same experience as web applications to the users, and under the condition of allowed bandwidth, can further support functions such as real-time news update and streaming media, and can greatly improve the richness and representation capability of message content. The users may not limited by the volume of information, and can express their own ideas completely with one widget message.

DETAILED DESCRIPTION

The Widget Message Service (WMS) described herein can send a widget (i.e., a small application on internet) to the receiver, and the receiver can run the widgets directly when receiving them. A widget can carry richer and more vivid contents than SMS/MMS. A widget can be developed with any webpage development tool or the widget SDK developed from Borqs.

Figure 1:
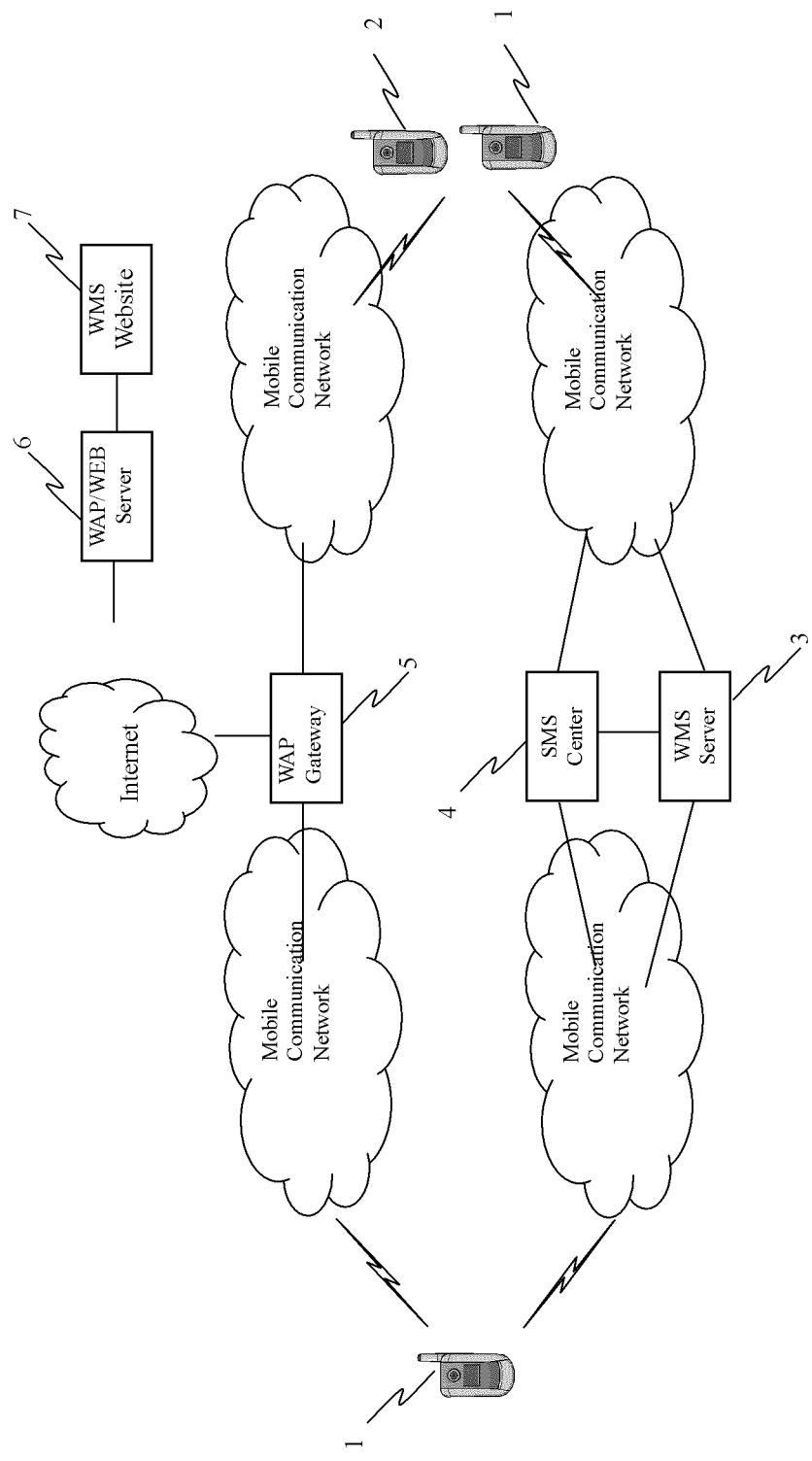
FIG. 1 is a schematic diagram of an embodiment of a WMS transmission system.

FIG. 1 shows the basic framework of an embodiment of a WMS transmission system. The WMS transmission system can include: a widget mobile terminal 1 configured to send widget messages (data packets) containing source address (e.g., local terminal number) and address of the receiver (e.g., number of the receiver) to the receiver via a widget server 3.

In one embodiment, a widget server 3 can be configured to perform the following operations: judging whether the receiver supports a widget, after receiving a widget message sent from the widget mobile terminal; sending the received widget message to the receiver, if the receiver can be judged as supporting the widget; and sending a corresponding message to the receiver via a SMS center, if the receiver can be judged as not supporting the widget.

The mobile communication network shown in FIG. 1 can be a 2G mobile network (GPRS) or 3G mobile network. A WAP gateway can be connected between the mobile communication network and internet configured to convert the messages that can be suitable for transmission in the mobile communication network into the messages that can be suitable for transmission in the internet, or convert the messages that can be suitable for transmission in the internet into the messages that can be suitable for transmission in the mobile communication network. For example, WSP messages can be converted into HTML messages, or HTML messages can be converted into WAP messages. The mobile terminals 1 and 1' shown in FIG. 1 can be widget mobile terminals, which can be 2G or 3G mobile terminals equipped with a widget agent modules powered by a widget engine and installed with widget applications. The mobile terminal 2 shown in FIG. 1 can be an ordinary mobile terminal, i.e., a 2G or 3G mobile terminal.

The widget agent module in the widget mobile terminal can perform installation verification for widget installation packages, manage and run installed widgets; the widget engine in the widget agent module can provide a run-time environment for widgets, accomplish widget layout, rendering, and presentation, and extend API for invocation of local functions of cell phone by Javascript, for example.

The widget mobile terminal 1 can send widget messages to a widget website 7 through a network (e.g., mobile communication network, WAP gateway 5, internet, WAP/WEB server 6, or widget server 3) at the same time when it can send widget messages to the receiver through the mobile communication network, so that the receiver 2 which may not support widget can download the widget messages sent from the widget mobile terminal from the widget website 7. The receiver 2 which may not support widget can send a download request to the widget website 7 after it receives a notification sent from the widget server by SMS; the widget website 7 can search for the widget message data packets that can be consistent to the address of the receiver in all widget messages stored in it, according to the source address contained in the download request, and then can send the widget data packets found from it to the receiver. Then, the widget website can delete the stored widget message. If the stored widget message cannot be downloaded within a first time, the widget website can delete the widget message. In an embodiment, the first time can be preset.

Figure 2:
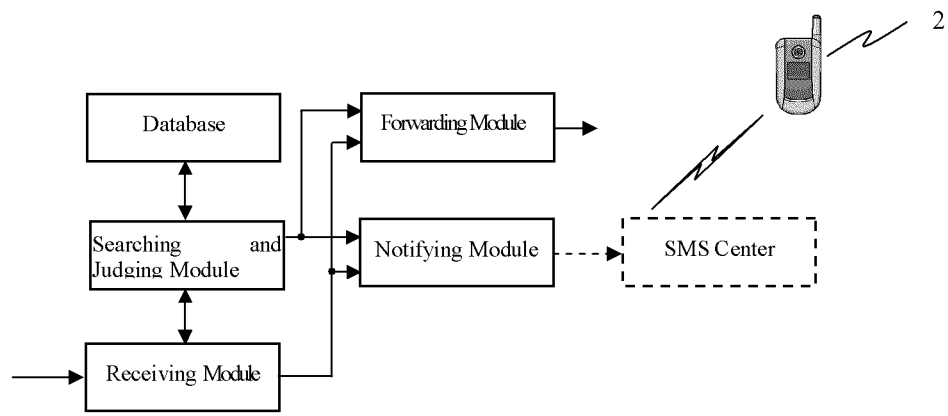
FIG. 2 is a schematic diagram of an embodiment of a widget server.

FIG. 2 shows an embodiment of the widget server 3. The widget server 3 can include: a database that can store the widget registration information of all the widget mobile terminals; a receiving module configured to receive the widget message data packets; a searching and judging module configured to search for the widget registration information of the receiver according to the address of the receiver contained in the received widget message and judge whether the receiver supports a widget according to the searching result; a forwarding module configured to forward the received widget message data packets to the receiver 1' which supports the widget; and, a notifying module configured to notify the receiver which does not support the widget (e.g., an ordinary mobile terminal) to download the widget message from the WMS website.

One embodiment of the widget server 3 shown in FIG. 2 can include: the receiving module can receive a widget message sent from a widget mobile terminal (caller), buffer the message, and then transmit the message to the searching module; the searching module can search for the widget registration information of the phone number in the database according to the address (i.e., phone number) of the receiver; if the widget registration information corresponding to the phone number can be found, the WMS server will judge that the receiver can be a widget mobile terminal, enable the forwarding module, and notify the receiving module to send the buffered widget data packets to the receiver via the forwarding module to the receiver. If the widget registration information cannot found, the WMS server can judge that the receiver can be an ordinary mobile terminal that cannot support the widget, and therefore can enable the notifying module to generate a notification SMS like "please download the widget message from the widget website" according to the address of the receiver contained in the widget message buffered in the receiving module, and can send the SMS message to the receiver 2 that does not support the widget via a SMS center.

Figure 3:
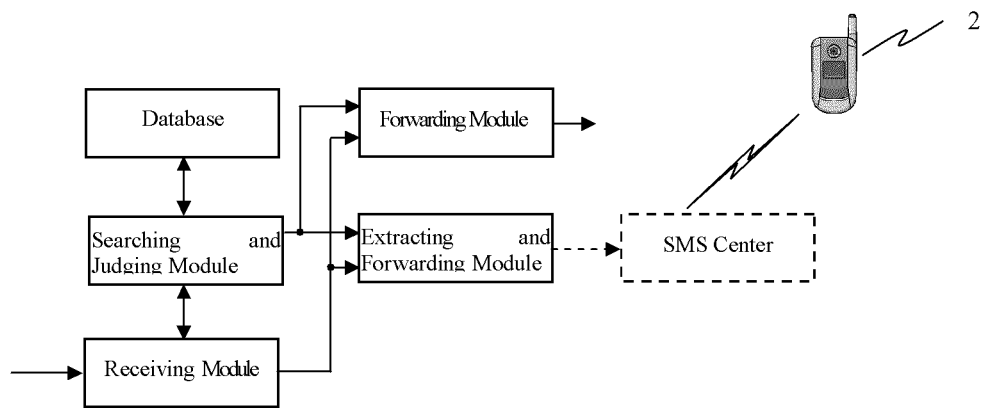
FIG. 3 is a schematic diagram of an embodiment of another widget server.

FIG. 3 shows another embodiment of the widget server 3. A difference between the embodiment shown in FIG. 2 and the embodiment shown in FIG. 3 can be that the notifying module in the embodiment of FIG. 2 can be changed into an extracting and forwarding module, which can be configured to extract the textual part in the received widget message data packets, and can forward the textual part to the called mobile terminal via a SMS center.

In another embodiment, the receiving module can buffer the received widget message sent from a calling widget mobile terminal, and then can transmit the widget message to the searching and judging module; the searching and judging module can search for the widget registration information of the receiver in the database according to the address of the receiver contained in the widget message; if the widget registration information can be found, judge that the receiver can be a widget mobile terminal, and then can enable the forwarding module, and can notify the receiving module to send the buffered widget message to the receiver that can support the widget via the forwarding module. If no widget registration information can be found, then can enable the extracting and forwarding module, to extract the textual part from the buffered widget message of the receiving module, and can forward the textual part to the called mobile terminal 2 via a SMS center 4.

The transmission between widget mobile terminals can be accomplished by means of WMS data packets, i.e., the widget can be encapsulated into the attachment of a MMS, and then the MMS can be sent to the receiver. Specifically, encapsulating the widget into the attachment of MMS can be implemented by the MMS module of cell phone, and the process can include: the widget agent module can initiate a request to send widget to the MMS application, and can inform the MMS application of the sending description information and the file path of the widget message data packets to be sent; after receiving the request, the MMS application can create a MMS instance, check and verify the attribute information (e.g., size) of the widget message data packets to be sent, and then can wait for the user to acknowledge the sending operation after checking; once the user acknowledges the sending operation, the MMS application can initiate a dial-up connection in PS domain, and can transmit the widget message data packets to the called widget mobile terminal.

Figure 4:
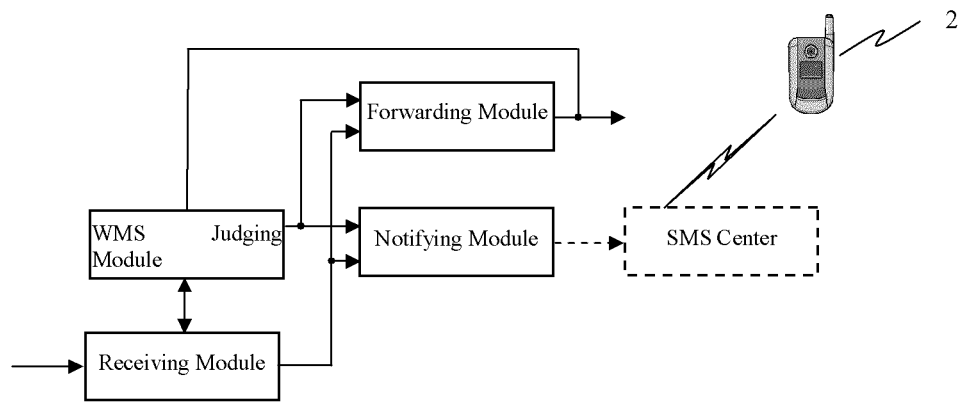
FIG. 4 is a schematic diagram of an embodiment of yet another widget server.

FIG. 4 shows yet another embodiment of the widget server 3. The widget server 3 can include: a receiving module configured to receive widget messages; a widget judging module configured to send a push message to the receiver according to the address of the receiver contained in the widget message and receive a response message returned from the receiver according to the address contained in the push message; a forwarding module configured to forward the received widget message data packets to forwarding module of the receiver which supports widget; and a notifying module configured to notify the receiver which does not support widget to download the widget message from the widget website.

In yet another embodiment, the widget server 3 shown in FIG. 4 can include: the receiving module can receive a widget message sent from a widget mobile terminal (caller), buffer the message, and then transmit the message to the widget judging module; the widget judging module can send a push message to the receiver (to notify the receiver that a widget message has arrived), according to the address of the receiver contained in the received widget message; if a response message returned from the receiver according to the source address contained in the push message can be received within a first time, judge that the receiver can be a widget mobile terminal; otherwise, it can judge that the receiver can be an ordinary mobile terminal that does not support a widget. When the receiver can be judged as a widget mobile terminal, the widget judging module can enable the forwarding module, and can notify the receiving module to send the buffered widget message data packets to the receiver via the forwarding module. When the receiver can be judged as an ordinary mobile terminal that does not support the widget, the widget judging module can enable the notifying module to extract the address of the receiver from the widget message buffered in the receiving module and generate a notification SMS like "please download the widget message from the widget website", and can send the message to the called mobile terminal 2 via a SMS center 4.

Figure 5:
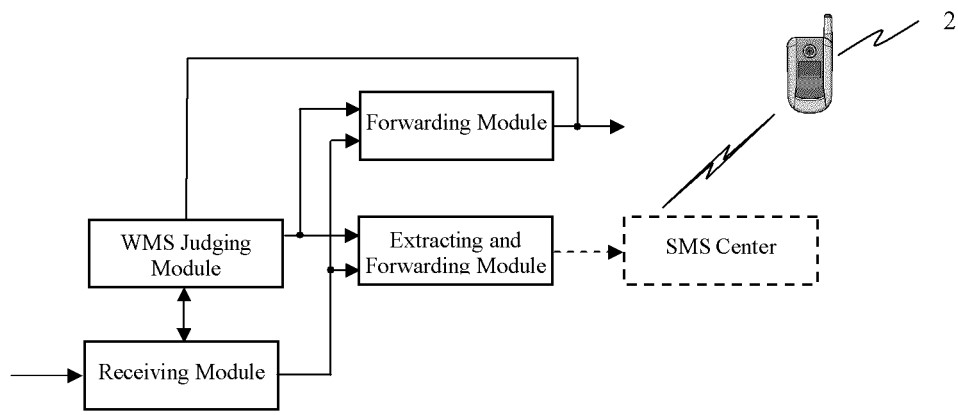
FIG. 5 is a schematic diagram of an embodiment of a widget server.

FIG. 5 shows another embodiment of the widget server 3. A difference between the embodiment shown in FIG. 5 and the embodiment shown in FIG. 4 can include that the notifying module in the embodiment shown in FIG. 2 can be changed into an extracting and forwarding module, which can be configured to extract the textual part in the received widget message, and can forward the textual part to the called mobile terminal via a SMS center.

The extracting and forwarding module can extract the textual part of the buffered widget message in the receiving module and can forward the textual part to the called mobile terminal 2 via a SMS center 4 if the receiver can be judged as an ordinary mobile terminal that does not support widget.

In other embodiment, the WMS transmission method can include the following steps: sending a widget message that contains source address and address of the receiver, by a widget mobile terminal 1, to the receiver, via a widget server 3; receiving the widget message and judging whether the receiver supports a widget (i.e., whether the receiver can be a widget mobile terminal 1') by the widget server 3; forwarding the received widget message to the receiver 1, if the receiver can be judged by the widget server 3 to be a receiver supporting widget mobile terminal; and sending a notification message to the receiver via a SMS center, or extracting the textual part from the widget message data packets and forwarding the textual part to the receiver via a SMS center, if the called mobile terminal can be judged by the widget server 3 as an ordinary mobile terminal 2 that does not support the widget.

The widget server can judge whether the receiver supports a widget through the following steps: sending a push message that contains the address of the widget server to the receiver, to inform the receiver of the existence of widget message; judging that the receiver supports the widget, if the receiver returns a response message according to the address of the widget server contained in the push message; judging that the receiver does not support the widget, if no response message can be returned from the receiver within a first time. In another embodiment, the first time can be preset.

The receiver which can be judged as supporting the widget can be a widget mobile terminal 1' equipped with a widget agent module, and the response message can be a user agent message generated by the widget agent module and contains a widget identifier.

The widget server 3 can judge whether the receiver supports widget through the following steps: searching for the widget registration information of the receiver in a database, according to the address of the receiver contained in the widget message; judging that the receiver supports the widget, if the widget registration information can be found; otherwise judging that the receiver cannot support the widget.

The corresponding message can be a notification message that can be used to notify the receiver to download the widget message from the widget website, wherein, the widget website can receive the widget message from the widget server. Or, the corresponding message can be textual message extracted from the widget message.

In the another embodiment, the receiver which can be judged as not supporting widget can be a 2G or 3G mobile terminal that cannot be equipped with a widget agent module.

In yet another embodiment, the widget mobile terminal can download a widget installation package that can contain resources required for running the widget, configuration information, and security authentication information from the widget website 7 through the mobile communication network, WAP gateway 5, internet, and WAP/WEB server 6. The widget installation package can contain resources required for running the widget, configuration information, and security authentication information. When the installation package reaches to the cell phone terminal, the widget agent module can be activated to install the installation package, through the following steps: first, the integrality and validity of the installation package can be verified; then, security check can be carried out for the installation package with the security authentication information; next, the installation package can be unzipped, the configuration information can be run and stored and the run-time environment can be prepared; then, the user can be prompted to decide whether to run the widget immediately; if the user selects yes, the widget engine can be activated to run the widget.

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A Widget Message Service (WMS) transmission method for transmitting widgets via Multimedia Message Service (MMS), the method comprising:
   receiving at a server a widget message from a first device via a mobile communication network, the widget message being addressed to a second device and comprising an executable application, the widget message comprising a MMS message including the executable application encapsulated into an attachment of the MMS message;
   determining, by the server, whether the second device is equipped with a widget agent module comprising a run-time environment dedicated to executing executable applications that are receivable via widget messages including the widget message;
   sending, by the server, the widget message to the second device via the mobile communication network in response to determining that the second device is equipped with the widget agent module; and
   sending, by the server, a notification message indicating the widget message is available for download at a website to the second device via the mobile communication network in response to determining that the second device is not equipped with the widget agent module, the notification message comprising a Short Message Service (SMS) message,
   wherein the server comprises computer hardware, and
   wherein determining whether the second device is equipped with a widget agent module comprises:
      searching for widget registration information of the second device in a database using a phone number of the second device contained in the widget message;
      determining that the second device is equipped with the widget agent module in response to determining that the widget registration information is found in the database; and
      determining that the second device is not equipped with the widget agent module in response to determining that the widget registration information is not found in the database.

2. The method of claim 1, wherein the mobile communication network comprises a 3G mobile network.

3. The method of claim 1, wherein the widget agent module is configured to control an application layout and rendering for the executable application when the widget agent module executes the executable application.

4. The method of claim 1, wherein the first device and the second device each comprise a cell phone.

5. A Widget Message Service (WMS) transmission system for transmitting widgets via Multimedia Message Service (MMS), comprising:
   a server comprising computer hardware configured to:
      in response to receiving a widget message from a first device via a mobile communication network, the widget message being addressed to a second device and comprising an executable application, determine whether the second device is equipped with a widget agent module comprising a run-time environment dedicated to executing executable applications that are receivable via widget messages including the widget message, send the widget message to the second device via the mobile communication network in response to determining that the second device is equipped with the widget agent module, and send a notification message indicating the widget message is available for download at a website to the second device via the mobile communication network in response to determining that the second device is not equipped with the widget agent module, the notification message comprising a Short Message Service (SMS) message, wherein the server is configured to search for widget registration information of the second device in a database using a phone number of the second device contained in the widget message and determine whether the second device is equipped with the widget agent module according to a result of the search, and wherein the widget message comprises a MMS message including the executable application encapsulated into an attachment of the MMS message.

6. The system of claim 5, wherein the mobile communication network comprises a 3G mobile network.

7. The system of claim 5, wherein the widget agent module is configured to control an application layout and rendering for the executable application when the widget agent module executes the executable application.

8. The system of claim 5, wherein the first device and the second device each comprise a cell phone.

* * * * *